United States Patent [19]

Takagi

[11] 4,424,979

[45] Jan. 10, 1984

[54] SUSPENSION AND STEERING ASSEMBLY FOR SNOWMOBILE

[75] Inventor: Izumi Takagi, Akashi, Japan

[73] Assignee: Kawasaki Jukogyo Kabushiki Kaisha, Kobe, Japan

[21] Appl. No.: 372,589

[22] Filed: Apr. 28, 1982

Related U.S. Application Data

[63] Continuation of Ser. No. 146,910, May 5, 1980, abandoned.

[51] Int. Cl.$^3$ ............................................. B62B 13/08
[52] U.S. Cl. .................................... 280/21 R; 280/25; 280/26
[58] Field of Search ..................... 280/21 R, 21 A, 16, 280/12 R, 12 F; 180/190

[56] References Cited

U.S. PATENT DOCUMENTS 3,425,707  2/1969  Horiuchi et al. ...................... 280/16
3,809,172  5/1974  Hendrickson et al. ......... 180/190 X
3,931,862  1/1976  Cote ................................ 180/190 X

*Primary Examiner*—Joseph E. Valenza
*Assistant Examiner*—Donald W. Underwood
*Attorney, Agent, or Firm*—Jordan and Hamburg

[57] ABSTRACT

Suspension and steering assembly for a snowmobile including at least one ski for supporting a front portion of its body and also for steering the snowmobile, comprising a strut means capable of telescopically expanding and contracting, spring means, a shock absorber and a steering arm means. The strut means includes a first or inner strut member and a second or outer strut member, the first strut member being slidably mounted in the second strut member. The first or inner strut member is pivotally connected at its lower end to the surface of the ski. The second or outer strut member is rotatably supported to the body of the snowmobile. The spring means is operative to urge the two strut members to slide out of each other. The shock absorber is pivotally connected at one end to the ski and at the other end to the second strut member of the strut means, and extends obliquely with respect to the strut means. Steering arm means is fixedly secured to the second or outer strut member for rotating the strut means about its own axis when a steering gear is actuated.

5 Claims, 1 Drawing Figure

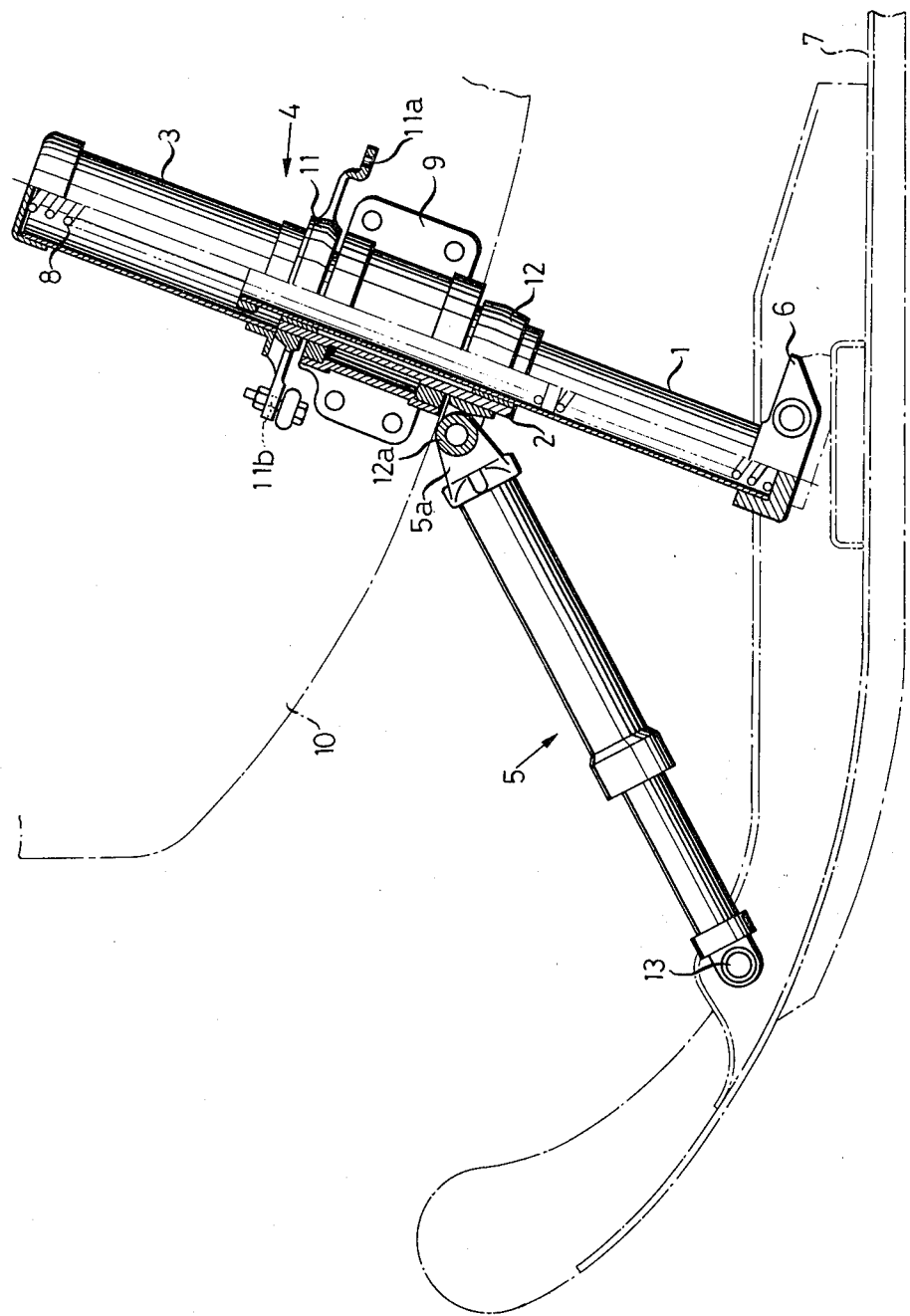

SUSPENSION AND STEERING ASSEMBLY FOR SNOWMOBILE

This is a continuation of application Ser. No. 146,910, filed May 5, 1980, now abandoned.

BACKGROUND OF THE INVENTION

This invention relates to a suspension and steering assembly for a snowmobile having at least one ski for supporting a front half of its body and also for steering the snowmobile.

Generally, a snowmobile includes full tractor treads supporting a rear portion of its body and also for driving the snowmobile, and one or two skis for supporting a front portion of its body and also for steering the snowmobile. When a leaf spring is used as an element of a suspension and steering assembly connecting the ski to the body of the snowmobile, it is impossible to obtain vertical displacements of a large value. Thus a coil spring and a shock absorber are mounted coaxially to provide a hollow strut member that can be expanded and compressed considerably in an axial direction relative to the ski in most of the snowmobiles now in use.

The aforesaid suspension and steering assembly is substantially similar in construction to that of motorcycles. However, unlike a motorcycle which is in contact with the ground at one point on the periphery of a tire of each wheel, a snowmobile is in contact at the undersurface of each ski with the surface of snow. The undersurface of each ski is in contact with the surface of snow in a wide area extending from front to rear, so that a high torque is required to turn the ski on the snow. When the suspension and steering assembly includes a single strut member, a torsional moment of a high magnitude would be exerted on the strut member and a high force would be exerted on the connection between assembly and the ski. This would result in an increase in cost or provide a potential source of trouble.

Also when the ski is pivotally connected to the lower end of the strut member, the ski may move about the lower end of the strut member and may not be fixed. In moving on the surface of snow which is irregular, the ski may tend to move in violent pitching motion in a vertical plane and impair the riding comfort of riders of the snowmobile. An added disadvantage is that in transporting the snowmobile it is necessary to fix the skis by using additional means which is troublesome.

The aforesaid disadvantages of the prior art are obviated by the present invention. Accordingly, the invention has as its object the provision of a suspension and steering assembly for a snowmobile which is novel and enables a torque to be transmitted smoothly to its ski when the snowmobile is steered and permits the ski to be suitably fixed during operation, so that the assembly can suitably absorb shock with respect to the pitching movement, the vertical movement and the turning movement of the ski during operation.

SUMMARY OF THE INVENTION

According to the invention, there is provided a suspension and steering assembly for a snowmobile including at least one ski for supporting a front portion of its body and also for steering the snowmobile, comprising strut means including a first or inner strut member and a second or outer strut member telescopically sliding one into the other, spring means operative to urge the two strut members to slide out of each other, shock absorber means pivotally connected at one end to the ski and at the other end to the second or outer strut member, means for supporting the second or outer strut member for rotational movement while preventing its axial movement and its lateral movement, and steering arm means fixedly secured to the second or outer strut member for rotating the strut means about its own axis when a steering gear is actuated, wherein the first or inner strut member is pivotally connected at its lower end to the surface of the ski.

Additional and other objects, features and advantages of the invention will become evident from the description set forth hereinafter when considered in conjunction with the accompanying drawing, wherein:

The single drawing is a side view, with certain parts being shown in section, of the suspension and steering assembly comprising one embodiment of the invention.

DETAILED DESCRIPTION OF A PREFERRED EMBODIMENT

A preferred embodiment of the invention will now be described by referring to the drawing wherein a body 10 and a ski 7 are connected to each other by strut means 4 including a first strut member (inner member) 1 and a second strut member (outer member) 2 one telescopically slidable into the other, and a housing 3 connected to the upper end of the second strut member (outer member) 2. The shock absorber 5 is connected at one end to the second strut member (outer member) 2 and at the other end to the ski 7 to extend obliquely.

The first strut member (inner member) 1 is connected at its lower end to the ski 7 through a ski mounting member 6 for pivotal member about a horizontal shaft extending through the mounting member 6. A coil spring 8 is mounted in the strut means 4 coaxially therewith and maintained in pressing engagement with the lower end of the first strut member (inner member) 1 at its lower end and with the upper end of the housing 3 at its upper end for urging the strut means 4 to move to a telescopically expanded position by its biasing force.

The second strut member (outer member) 2 is supported by the body 10 through a support member 9 for rotation about its own axis while being prevented from moving axially and laterally with respect to the body 10. The second strut member (outer member) 2 has fitted over its outer periphery and secured thereto an annular steering arm 11 which is adapted to be rotated about the axis of the strut means 4 by a steering gear, not shown. The steering arm 11 is formed with openings 11a and 11b in two projections which respectively receive therein a steering rod connected to the steering gear and one end of a tie rod connected to a steering arm of the other suspension and steering assembly for the snowmobile.

Secured to the lower end of the second strut member (outer member) 2 is a connector 12 for pivotally supporting the upper end of the shock absorber 5 which is formed at its side with a bearing portion 12a having a substantial length in the horizontal direction. The shock absorber 5 is formed at its upper end with a fork to provide brackets 5a having a connecting bolt connected thereto at opposite ends and extending through the bearing portion 12a, so that the shock absorber 5 can move freely in pivotal movement while being prevented from being twisted by an external force.

The shock absorber 5 is connected at its lower end to the surface of the ski 7 at a point 13 disposed forwardly of the ski mounting member 6 at which the strut means 4 is pivotally connected to the ski 7. The lower end of the shock absorber 5 is also pivotally supported by a horizontal shaft on the ski 7.

From the foregoing, it will be appreciated that the body 10 is stably supported by the ski 7 through the strut means 4 having the spring 8 mounted therein and capable of telescopically expanding and contracting, and the shock absorber 5 pivotally connected to the ski 7 and the strut means 4 and extending obliquely from the strut means 4. By this arrangement, the ski 7 can also be inclined to conform to the slope of the surface of snow to permit the undersurface of the ski to be maintained in contact with the snow at all times, and the distance between the body of the snowmobile and the ski can be adjusted by the telescopic sliding movement of the members 1 and 2 of the strut means 4. The provision of the shock absorber 5 has the effects of absorbing shock which might otherwise be applied to the body of the snowmobile by the sudden pitching movement or vertical movement of the ski.

In steering the snowmobile, the steering gear is manipulated to rotate the steering arm 11. This turns the strut means 4 and at the same time rotates the shock absorber 5 about the axis of the strut means 4, so that a turning torque is transmitted to the ski 7 with leverage or high magnitude. This avoids application of a force of high magnitude to the connections between the lower end of the strut means 4 and the lower end of the shock absorber 5 and the surface of the ski 7.

The strut means 4 is normally somewhat inclined with respect to the ski 7 as shown, and the shock absorber 5 has its length varied when the ski 7 turns in a horizontal plane. Thus the shock absorber 5 has the effect of braking the turning movement of the ski in addition to the pitching movement and vertical movement thereof, thereby enabling stable and smooth travel of the snowmobile. In the embodiment shown and described hereinabove, the shock absorber is connected at its lower end to the surface of the ski at a point forwardly of the mounting member for supporting the strut means on the surface of the ski. However, the invention is not limited to this specific position of the shock absorber and that the shock absorber may be disposed rearwardly of the strut means with the same effects.

According to the invention, the stability of the ski travelling on the snow can be enhanced and the pitching movement, vertical movement and turning movement of the ski can be suitably braked and shock applied to the ski during these movements can be absorbed, to thereby increase riding comfort of the riders by enabling the snowmobile to travel smoothly and stably. No great stresses are produced in the component parts of the snowmobile, so that the safety of travel is ensured.

What is claimed is:

1. A suspension and steering assembly for a snowmobile including at least one ski for supporting a front portion of its body and also for steering the snowmobile, comprising:
    substantially cylindrical strut means including a first or inner concentric strut member and a second or outer circumferential strut member telescopically sliding one into the other;
    spring means operative to urge said two strut members to slide out of each other;
    shock absorber means connected at one end to the ski and at the other end, through a substantially horizontal bearing, to the second or outer strut member to extend obliquely;
    means for supporting the second or outer strut member on the snowmobile body for rotational movement while preventing its axial movement and its lateral movement; and
    annular steering means fixedly secured to the second or outer strut member for rotating the strut means about its own axis when a steering gear is actuated, said annular steering means comprises two openings, one opening to receive said steering rod connected to said steering gear, and said other opening to receive said tie rod of said other suspension and steering assembly for said snowmobile;
    wherein the first or inner strut member is pivotally connected at its lower end to the surface of the ski and said shock absorber means is pivotally connected to the ski at a point away from the point at which said strut means is pivotally connected to the ski.

2. A suspension and steering assembly for a snowmobile as claimed in claim 1, wherein said strut means has an axis which is inclined with respect to the ski.

3. A suspension and steering assembly for a snowmobile as claimed in claim 1 or 2, wherein said shock absorber is pivotally connected to the ski at a point forwardly of the point at which said strut means is pivotally connected to the ski.

4. The suspension and steering assembly of claim 3 in which said shock absorber comprises a cylinder and rod, with the cylinder connected to the second or outer strut member and the rod connected to the ski.

5. The suspension and steering assembly of claim 1, in which one opening is positioned on said steering means on one side of said second or outer strut member, and said other opening is positioned on said steering means on the other side of said second or outer strut member.

* * * * *